Aug. 14, 1928.

O. C. TRAVER 1,680,754

SYNCHRONIZING DEVICE

Original Filed Nov. 24, 1926

Inventor:
Oliver C. Traver,
by *Alexander S. Lewis*
His Attorney.

Patented Aug. 14, 1928.

1,680,754

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

SYNCHRONIZING DEVICE.

Application filed November 24, 1926, Serial No. 150,606. Renewed April 21, 1928.

My invention relates to improvements in synchronizing devices, and has for an object to provide an improved synchronizing device for automatically controlling the operation of connecting two alternating current circuits whereby to provide for the time of the closing operation of the connecting means so that the connection can occur only when the electromotive forces of the circuits are substantially alike in phase and frequency.

When two energized alternating current circuits or systems are to be connected, it is desirable that their electromotive forces be alike in phase and frequency, when the connection is completed. The connecting operation should, therefore, be started sufficiently prior to the in phase and in frequency condition to allow for the time of operation of the switching means by which the circuits are to be connected. While this switching operation may be started over a considerable range in the phase difference when the difference between the frequencies of the electromotive forces is less than a predetermined value, as disclosed in United States Letters Patent 1,563,120, issued to me November 24, 1925, reissued February 8, 1927, reissue No. 16,540, and assigned to the same assignee as this invention, I now propose, in order to reduce the chances of connecting the circuits when they are not in phase and in frequency, further to limit the conditions under which the switching operation can be started to only a definite predetermined phase difference when the difference between the frequencies is less than a predetermined value.

My invention will be better understood from the following description when considered in connection with the accompanying drawing, and its scope will be pointed out in the appended claims.

Figure 1:
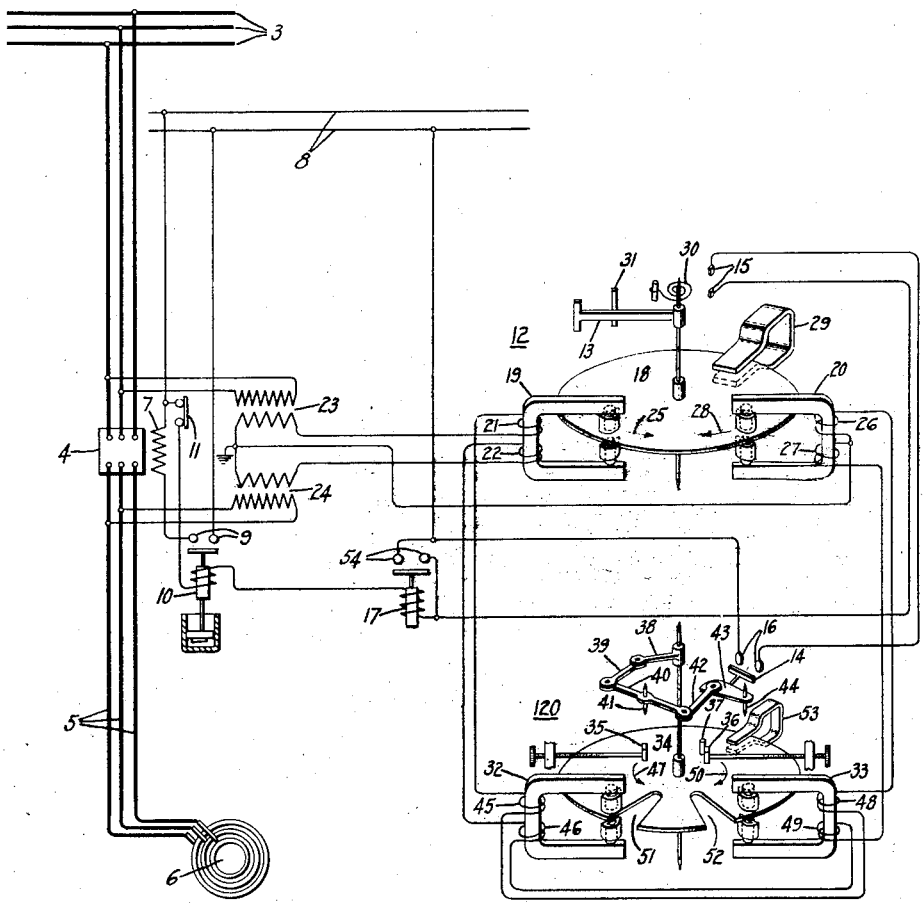
Figure 2:
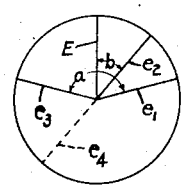

In the accompanying drawing, Fig. 1 illustrates diagrammatically an embodiment of my invention, and Fig. 2 is a vector diagram explanatory of the operation of the embodiment of my invention shown in Fig. 1.

For purposes of illustration, I have shown in Fig. 1 an embodiment of my invention as applied to a three phase alternating current electric system comprising an alternating current circuit, such as a bus 3 to which may be connected, by any suitable circuit controlling or switching means 4, another alternating current circuit 5 herein shown as comprising an alternator 6. The switching means 4 may be of the latched closed type, and, as shown comprises a closing coil 7 whose circuit is arranged to be energized from a control bus 8 through the contacts 9 of a control relay 10. This relay is illustrated as instantaneous closing time delay opening to allow for the time necessary to insure the latching of the switching means. The purpose of the control relay 10 is to relieve the more delicate contacts of the electroresponsive apparatus, hereinafter described and embodying my invention, from the heavy duty involved in directly controlling the circuit of the closing coil 7, which often requires a relatively large current. Included in the circuit of the control relay 10 for opening the circuit thereof upon closure of the switching means 4, is an auxiliary switch 11 associated with the switching means and arranged to be closed when the switching means is open, and vice versa in a manner well known to the art.

For controlling the control relay 10 and through this relay the switching means 4, so as to start the closing operation thereof in time to effect closure when the electromotive forces of the circuits 3 and 5 are substantially alike in phase and frequency, I provide, in accordance with my invention, electroresponsive means controlled in accordance with the phase difference and the difference between the frequencies of the electromotive forces of the circuits 3 and 5 so that the closing operation of the switching means 4 is started only at a predetermined phase difference when the frequency difference is less than a predetermined value. The electroresponsive means shown comprises a plurality of differential relays 12 and 120, the latter of which forms the subject matter of my divisional application, Serial No. 188,008, filed April 30, 1927, for relay. These relays are arranged respectively to control a plurality of circuit controlling members, such as movable contacts 13 and 14 which, in order to start the closing operation of the switching means, must simultaneously be in predetermined positions. For this purpose, the circuit controlling members 13 and 14 are arranged to control contacts 15 and 16 respectively, which are arranged in series in a control circuit including the control relay 10, an auxiliary relay 17 and the auxiliary switch 11 and arranged to be energized from the control bus 8.

The circuit controlling member 13 is arranged to be controlled in accordance with the difference between the vector sum of and the vector difference between the electromotive forces of the circuits 3 and 5 and to tend to move to circuit controlling or switch closing position during a predetermined range of phase difference, which may include phase coincidence, of the electromotive forces of the circuits. For this purpose, the circuit controlling member 13 may be arranged to be actuated by a movable member, such as a conducting disk 18, which is arranged to have opposing torques exerted thereon by suitable electromagnetic means such as shaded pole motor elements 19 and 20. The motor element 19, as shown, comprises two windings 21 and 22 which are connected to be energized in accordance with corresponding electromotive forces of the circuits 3 and 5 respectively. For this purpose, the windings 21 and 22 may be connected to the secondaries of potential transformers 23 and 24 respectively whose primaries are connected across corresponding phases of the circuits 3 and 5 respectively. The windings 21 and 22 are so connected and arranged as to produce an electromagnetic effect dependent on the vector sum of the corresponding electromotive forces. This effect, manifested as a torque by virtue of the shaded poles, is therefore a maximum when the electromotive forces are in phase and a minimum when they are in phase opposition. In the arrangement shown, the shaded poles are so arranged that the torque of the motor element 19 tends to turn the disk 18 in circuit closing direction, that is, in the direction indicated by the arrow 25. The motor element 20 as shown also comprises two windings 26 and 27 which are connected to be energized in accordance with corresponding electromotive forces of the circuits 3 and 5 respectively in a manner similar to the windings 21 and 22. The windings 26 and 27, however, are so connected and arranged as to produce an electromagnetic effect dependent on the vector difference of the corresponding electromotice forces. This effect, manifested as a torque by virtue of the shaded poles, is, therefore, a minimum when the electromotive forces are in phase and a maximum when they are in phase opposition. In the arrangement shown, the shaded poles are so arranged that the torque of the motor element 20 tends to turn the disk 18 in the direction indicated by the arrow 28.

By suitable adjustment of the shaded poles of the motor elements 19 and 20, either of these elements can be arranged to predominate over the other throughout a predetermined range in the phase difference of the electromotive forces of the circuits 3 and 5 and the other element to predominate throughout the remainder of the phase difference range. For example, referring to Fig. 2 in which E is taken as a stationary vector representing the electromotive force of the bus 3 in a position considered as the in-phase condition, the motor element 19 may be arranged to predominate over the motor element 20 when the phase difference is anywhere within a predetermined range, herein shown as including phase coincidence and indicated by the angle $a$ between the vectors $e_1$ and $e_3$, which represent two instantaneous positions of the electromotive force $e$ of the circuit 5 relatively to E. Thus, whenever the phase difference is anywhere within the range represented by the angle $a$, the motor element 19 overcomes the restraint of the motor element 20 and tends to move the disk 18 in circuit closing direction. Outside of this range or in the angle $(360°-a)$, the motor element 20 overcomes the restraint of the motor element 19 and tends to move the disk 18 in the opposite direction.

In order to prevent any possibility of starting the closing operation of the switch 4 when the frequency difference is too large, I provide means such as a permanent drag magnet 29 for retarding the movement of the disk 18, whereby, even though the phase difference be small enough for the motor element 19 to predominate and thereby to start the disk moving in circuit closing direction, the circuit closing movement will not be completed, unless the frequency difference is less than a predetermined value. If the frequency difference is below such value, the angular velocity of the disk 18 will increase with decreasing phase difference, since the resultant torque available to turn the circuit controlling member 13 in circuit closing direction increases as the phase difference decreases.

If neither of the circuits 3, 5, were energized, the disk 18 and therefore the circuit controlling member 13 would tend to remain in whatever position they were left, since the resultant torque would be zero. In order to eliminate any possibility of an erroneous closing operation due to such a variation in the position of the circuit controlling member 13, I provide suitable means such as a spring 30 having sufficient torque merely to turn the disk 18 in the direction of the arrow 28 when the resultant torque of the motor elements 19 and 20 is zero. This returns the circuit controlling member 13 to its initial position against the stop 31, so that whenever the circuits 3 and 5 are to be connected, the timing of the relay 12 will not be altered.

The circuit controlling member 14, as shown, is arranged to be controlled in accordance with the difference between the vector sum of and the vector difference between corresponding electromotive forces of the circuits 3 and 5 and to be actuated substantially instantaneously on the occurrence of a predetermined phase difference near phase coincidence, such as indicated by the angle $b$ between E and $e_2$ of Fig. 2, within the range of phase difference indicated by the angle $a$ over which circuit closing operation of the circuit controlling member 13 may occur. For this purpose, the differential relay 120 which controls the circuit controlling member 14 comprises electromagnetic torque producing means such as shaded pole motor elements 32 and 33 arranged to exert opposing torques on a movable member such as a disk 34. This disk is arranged for movement between two positions, which are determined by adjustably positioned stops 35 and 36 against which a pin 37 on the disk abuts. The disk 34, in its movement from one position to another, is arranged to actuate the circuit controlling member 14 through a contact controlling mechanism such that, as the disk moves through an intermediate position, the circuit controlling member momentarily engages the contacts 16. For this purpose, the contact controlling mechanism may comprise, as shown, a toggle having a link 38 which is mounted to move with the disk 34 and a link 39 which is pivotally connected to a lever 40. This lever is mounted on a fixed pivot 41 and is pivotally connected to a link 42 which is pivotally connected to an arm or crank 43. This crank is mounted on a fixed pivot 44 and carries the circuit controlling member 14.

The motor element 32, as shown, comprises two windings 45 and 46 which are connected to be energized in accordance with corresponding electromotive forces of the circuits 3 and 5 respectively, in a manner similar to the windings 21 and 22. The windings 45 and 46 are so connected and arranged as to produce an electromagnetic effect dependent on the vector sum of the corresponding electromotive forces. This effect, manifested as a torque by virtue of the shaded poles, is therefore a maximum when the phase difference of the electromotive forces is zero, and a minimum when the phase difference is 180°. In the arrangement shown the torque of the motor element 32 tends to turn the disk in the direction indicated by the arrow 47. The motor element 33, as shown, also comprises two windings 48 and 49 which are connected to be energized in accordance with corresponding electromotive forces of the circuits 3 and 5 respectively in a manner similar to the windings 26 and 27. The windings 48 and 49 are so connected and arranged as to produce an electromagnetic effect dependent on the vector difference of the corresponding electromotive forces.

This effect, manifested as a torque by virtue of the shaded poles, is therefore a minimum when the phase difference of the electromotive forces is zero, and a maximum when the phase difference is 180°. In the arrangement shown, the torque of the motor element 33 tends to turn the disk 34 in the direction indicated by the arrow 50. By suitable adjustment of the shaded poles of the motor elements 32 and 33, the former can be arranged to predominate over the latter at a predetermined phase difference such as indicated by the position of the electromotive force vector $e_2$ and vice versa for the position $e_4$, which may be substantially 180° from $e_2$. In order, however, to have a substantially instantaneous movement of the disk 34, the material thereof is so distributed, as for example, by cut away portions or slots 51 and 52, that when either motor element 32 or 33 predominates to start the disk, the torque of the stronger element is increased and the torque of the weaker element decreased, by reason of more of the disk being presented between the poles of the stronger element and less between the poles of the weaker element. In order to prevent unnecessary oscillation of the disk 34 and wear on the parts caused by such oscillation, a damping magnet 53 may be provided.

The toggle 38, 39 is so arranged that, in the extreme positions between which the disk 34 is movable, its effective lengths are the shortest. Then, as the disk 34 moves from one extreme position to an intermediate position, the toggle is moved from one side of its dead center position to the dead center position. The effective length of the toggle is thereby increased to a maximum and the circuit controlling member 14 momentarily engages the contacts 16. As the disk 34 moves from this intermediate position to its other extreme position, the toggle is moved to the other side of its dead center position. The effective length of the toggle is thereby decreased and the circuit controlling member 14 is retracted.

It will be understood that, if desirable, I may provide an additional control operative in response to the relative values of the electromotive forces of the circuits 3 and 5. Examples of such means are well known in the art, one suitable means being disclosed in my Letters Patent 1,563,120 heretofore referred to. Such additional control, which may comprise further contacts in the control circuit, is desirable where the circuits are to be connected only when their electromotive forces are nearly equal in value. In certain applications, however, I have found it unnecessary to provide such additional voltage control, inasmuch as my arrangement herein disclosed inherently operates to prevent closing the switch 4 unless the electromotive forces of the circuits are within a range sufficiently small in many cases for satisfactory operation.

Assuming the various parts positioned as shown in Fig. 1, and that it is desired to connect the alternator 6 to the bus 3, then as the phase difference between the electromotive forces of the bus and the alternator comes within a predetermined range indicated by the angle $a$ between the vectors $e_1$ and $e_3$, Fig. 2, the motor element 19 will predominate and close the contacts 13, 15 if the frequency is below a predetermined value. If the contacts 14, 16, which close momentarily at some predetermined phase difference $e_2$, close before the contacts 13 and 15 have closed, the switching means 4 will not be closed. If, however, the contacts 14, 16 close momentarily while contacts 13, 15 are closed, the control circuit, energized from the control bus 8 and comprising in series the contacts 14, 16, the contacts 13, 15, the auxiliary relay 17, the control relay 10 and the auxiliary switch 11, will be completed. This effects the energization of the control relay 10, and through its contacts 9, the energization of the closing coil 7 to start the closing operation of the switch 4. The auxiliary relay 17, when energized, closes its own circuit through its contacts 54 so that the control relay 10 remains energized until the auxiliary switch 11 opens, even though the contacts 14, 16 are closed but momentarily. While the contacts 14, 16 may be closed momentarily when the phase difference is that indicated by the vector $e_4$, the closing operation of the switch 4 cannot then be started, since $e_4$ is within the range $(360°-a)$, where the contacts 13, 15 cannot be closed.

While I have shown and described only one embodiment of my invention, I do not desire to be limited to the exact arrangement shown and described, but seek to cover in the appended claims, all those modifications that fall within the true spirit and scope of my invention.

What I claim as new and desire to secure by Letters Patent of the United States is:

1. In combination, two alternating current circuits, switching means for connecting the circuits, and means connected to be energized in accordance with the difference between the effects of the sum of and the difference between the electromotive forces of the circuits for starting the closing operation of the switching means only at a definite predetermined phase difference of the electromotive forces when the difference between the frequencies of the electromotive forces is less than a predetermined value.

2. In combination, two alternating current circuits, switching means for connecting the circuits, means comprising a control circuit having a plurality of connections arranged when closed to start the closing operation of the switching means, means for closing one of said connections comprising a retarded movable member controlled in accordance with the phase difference between the electromotive forces of the circuits, and means for closing another of said connections comprising a movable member controlled in accordance with the phase difference between the electromotive forces and arranged at an intermediate position in its movement to effect a momentary closure of said other connection.

3. Synchronizing means for two alternating current circuits comprising a differential electroresponsive element having a retarded movable circuit controlling member adapted to be actuated in accordance with the sum of and the difference between the electromotive forces of the circuits, a differential electroresponsive element having a quickly movable circuit controlling member adapted to be actuated in accordance with the sum of and the difference between the electromotive forces of the circuits and a circuit controlled by said members and arranged to be completed momentarily as the quickly movable member moves through a predetermined position in response to a change in the phase relation of the electromotive forces of the circuits after a predetermined movement of the retarded movable member.

4. In combination, two alternating current circuits, switching means for connecting the circuits, and synchronizing means for starting the closing operation of the switching means only at a predetermined phase difference between the electromotive forces of the circuits when the difference between the frequencies of the electromotive forces is less than a predetermined value comprising a retarded movable member controlled in accordance with the sum of and the difference between the electromotive forces, and another movable member controlled in accordance with the sum of and difference between the electromotive forces and arranged upon movement through a predetermined position to start the closing operation of the switching means only after the completion of the movement of the retarded member.

5. In combination, two alternating current circuits, a switch for connecting the circuits and means for controlling the closing of the switch comprising a plurality of relays connected and arranged so that the movable elements thereof must simultaneously be in predetermined positions to start the closing operation of the switch, one of said relays being connected to said circuits and arranged to tend to move to switch closing position during a predetermined range of phase difference between the electromotive forces of the circuits and to move from switch closing position when the phase difference is outside this range, means for delaying the operation of said relay whereby the relay can reach switch closing position only when the difference between the frequencies of the electromotive forces is less than a predetermined value, and another of said relays being connected to said circuits and arranged to be actuated through switch closing position substantially instantaneously only at a predetermined phase difference within said predetermined range.

6. In combination, two alternating current circuits, a switch for connecting the circuits, and means for controlling the closing of the switch comprising a plurality of relays connected and arranged so that the movable elements thereof must simultaneously be in predetermined positions to start the closing operation of the switch, one of said relays being connected to said circuits and arranged to tend to move to switch closing position during a predetermined range of phase difference between the electromotive forces including phase coincidence and to move from switch closing position when the phase difference is outside this range, means for delaying the operation of said relay whereby the relay can reach switch closing position only when the difference between the frequences of the electromotive forces is less than a predetermined value, and another of said relays being connected to said circuits and arranged to be actuated through switch closing position substantially instantaneously only at a predetermined phase difference within said predetermined range.

7. A synchronizing device comprising a movable circuit controlling member, means for exerting opposing torques on the member, means for retarding the movement of the member to circuit controlling position, another movable circuit controlling member, means for exerting opposing torques on said other member quickly to move the member from one position to another when the torques differ by a predetermined amount, and circuit controlling mechanism adapted to be actuated momentarily as said other member moves through an intermediate position.

In witness whereof, I have hereunto set my hand this 23d day of November, 1926.

OLIVER C. TRAVER.